United States Patent [19]

Narayanan et al.

[11] 3,755,316

[45] Aug. 28, 1973

[54] THIAZOLINYL AND THIAZINYL DERIVATIVES OF INDOLES

[75] Inventors: Venkatachala L. Narayanan, Hightstown; Rudiger D. Haugwitz, Highland Park, both of N.J.

[73] Assignee: E. R. Squibb & Sons, Inc., Princeton, N.J.

[22] Filed: Oct. 20, 1971

[21] Appl. No.: 191,092

[52] U.S. Cl........... 260/243 R, 260/306.7, 424/246, 424/270
[51] Int. Cl............................................. C07d 93/06
[58] Field of Search...................... 260/243 R, 306.7

[56] References Cited
UNITED STATES PATENTS
2,577,409  12/1951  Emerson et al..................... 260/243
3,499,083  3/1970  Levitt............................. 260/243 X FOREIGN PATENTS OR APPLICATIONS
1,253,002  11/1971  Great Britain..................... 260/243

*Primary Examiner*—John M. Ford
*Attorney*—Lawrence S. Levinson, Merle J. Smith et al.

[57] ABSTRACT

Thiazolinyl and thiazinyl derivatives of indoles are provided having the structure

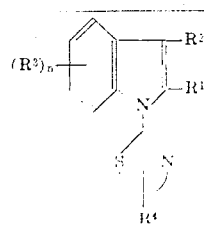

and which are useful as anti-inflammatory agents.

8 Claims, No Drawings

THIAZOLINYL AND THIAZINYL DERIVATIVES OF INDOLES

The present invention relates to thiazolinyl and thiazinyl derivatives of indoles having the structure (I)
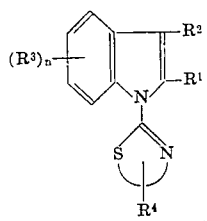

wherein $R^3$ is hydrogen, lower alkyl, lower alkoxy, aryl, acyl, aroyl, aryloxy, nitro, halogen, cyano, amido, substituted amido

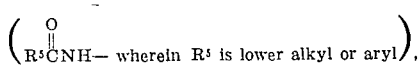
($R^5\overset{O}{\overset{\|}{C}}NH-$ wherein $R^5$ is lower alkyl or aryl), amino, substituted amino, dialkylaminoalkyl, or carboxyl, $R^1$ is hydrogen, lower alkyl, aryl or $-(CH_2)_{09_1}CO_2R^4$, $R^2$ is hydrogen, lower alkyl, cycloalkyl aryl, $-(CH_2)_1-CO_2R^4$, nitro, cyano, halogen or dialkylaminoalkyl, $R^4$ can be hydrogen, lower alkyl, or aryl; $n$ is 1 or 2, and $n^1$ is 0 to 5.

The radical

represents a 5- or 6-membered ring containing three or four carbon atoms, respectively, wherein the additional two or three carbon atoms (not shown) may include a substituent other than hydrogen as indicated above.

The lower alkyl groups represented by the above R groups include straight or branched chain aliphatic hydrocarbon radicals having up to seven carbon atoms, such as methyl, ethyl, propyl, isopropyl, butyl, isobutyl, t-butyl, amyl, hexyl, heptyl, and the like. The lower alkyl groups can include as substituents any of the aryl groups mentioned below as well as halogen.

The alkoxy group includes straight and branched chain radicals of up to and including seven carbon atoms, corresponding to the above alkyl groups, e.g., methoxy, ethoxy, propoxy, isopropoxy, and the like. The aryloxy group includes any of the aryl groups set out below.

The term "halogen" includes each of the four halogens, but fluorine and chlorine are preferred.

The substituted amido groups $$R^5\overset{O}{\overset{\|}{C}}NH-$$

wherein $R^5$ can be lower alkyl, arylalkyl, alkylaryl or aryl, wherein lower alkyl and aryl are as defined herein, can include methyl-amido, ethylamido, isopropylamido, heptylamido, phenyl-amido, benzylamido, or naphthylamido.

The substituted amino groups include mono- or di-lower alkyl-, arylalkyl-, lower alkylaryl- or arylamino wherein lower alkyl and aryl are as defined herein, such as methylamino, ehtylamino, isopropylamino, heptylamino, dimethylamino, diethylamino, ethylmethylamino, butylmethylamino, ethyl i-propylamino, anilino, benzylamino, diphenylamino, naphthylamino, or N-methyl-N-phenylamino and the like.

The term "aryl" includes monocyclic or bicyclic mono-valent aromatic ring systems such as phenyl or naphthyl. These aryl radicals can include as substituents halogen, nitro, trifluoromethyl, alkoxy, alkanoic acid, amido or substituted amido as defined above or any of the alkyl groups mentioned hereinbefore.

The acyl and aroyl groups included herein are derived from hydrocarbon carboxylic acids of less than 12 carbon atoms, which may be exemplified by the lower alkanoic acids (e.g., formic, acetic, propionic, butyric, valeric, trimethyl acetic and caproic acids), the lower alkenoic acids (e.g., acrylic, methacrylic, crotonic, 3-butenoic and senecioic acids), the monocyclic aryl-carboxylic acids (e.g., benzoic and toluic acids), the monocyclic aryl-lower alkanoic acids [e.g., phenacetic, β-phenylpropionic, α-phenylbutyric, and 5-(p-methylphenyl)pentanoic acids], the cycloalkyl carboxylic acids (e.g., cyclobutane carboxylic acid, cyclopentane carboxylic acid and cyclohexane carboxylic acid), the cycloalkenyl carboxylic acids (e.g., 2-cyclobutene carboxylic acid and 3-cyclopentene carboxylic acid), the cycloalkyl and cycloalkenyl-lower alkanoic acids [e.g., cyclohexane-acetic, α-cyclopentanebutyric, 2-cyclopenteneacetic and 3-(3-cyclohexene)pentenoic acid], and the like. The above acyl and aroyl groups may be represented by the formula

$R^o-\overset{O}{\overset{\|}{C}}-$, wherein $R^o$ may be lower alkyl, lower alkenyl, monocyclic aryl, monocyclic aryl-lower alkyl, cycloalkyl, cycloalkenyl, cycloalkyl-lower alkyl, and cycloalkyl-lower alkenyl.

Compounds of Formula I can be prepared by first converting the indole (II) into its salt (III) by reacting (II) with a base such as a metal hydride, for example sodium hydride, a metal amide, such as sodium amide, an alkali metal alkoxide, such as sodium methoxide, potassium ethoxide or sodium butoxide,

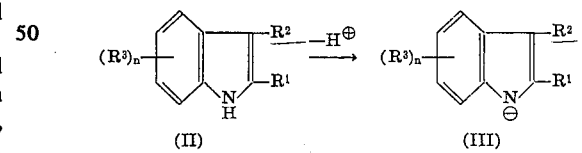

The above reaction can be brought about in a variety of aprotic solvents such as aromatic hydrocarbons, e.g., benzene, toluene or xylene, or ethers such as ethyl ether or glyme, at temperatures ranging from about 0° to about 150° for periods of about 1 hour to 24 hours. A slight excess of the base is desirable; thus the molar ratio of indole (II) to base can range from about 1:1 to about 1:2.

The salt (III) is reacted with an aliphatic haloalkyl-isothiocyanate (IV) to yield thiourea (V) which undergoes intramolecular alkylation to form the indole (I).

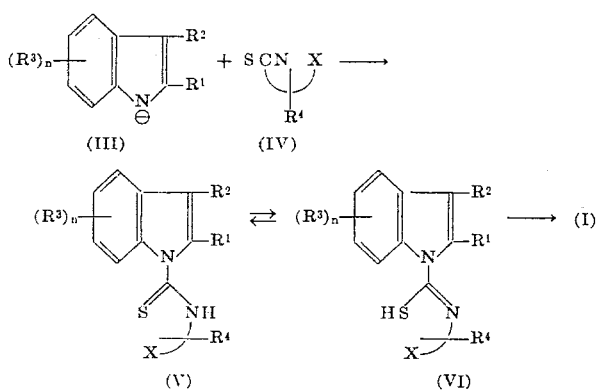

wherein X is Cl or Br and the portion

(which links N and X) in structure (IV) represents a chain of 2 or 3 carbon atoms one carbon atom of which may include an $R^4$ substituent other than hydrogen.

The molar ratio of indole (III) to haloalkylisothiocyanate (IV) can range from 1:1 to 1:5. The reaction time can vary from about 1 to about 10 hours at temperatures from about 35° to about 150°.

The preparation of a variety of indoles is well documented in Weissberger's *The Chemistry of Heterocyclic Compounds, Heterocyclic Compounds with Indole and Carbazole Systems*, Interscience Publishers, Co., New York, 1954 and in Sunberg's *The Chemistry of Indoles*, Academic Press, 1970.

It is to be understood that unsubstituted indoles (II), that is where the R's are hydrogen, can be employed to form compounds of Formula (I) and thereafter any of the other R radicals can be inserted in the indole ring in place of one or two hydrogens, employing conventional procedures as will be apparent to one skilled in the art.

Haloalkylisothiocyanates (IV) are readily synthesized from their corresponding haloalkyl amines (VII) and thiophosgene:

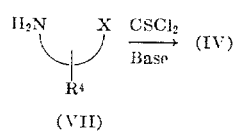

Additional routes toward compounds of structure (IV) are described in Houben-Weyl's *Methoden Der Organischen Chemie*, Vol. 9, G. Thieme Verlag Stuttgart, 1955.

Examples of indole starting materials (II) which can be employed herein include the following:

TABLE A

| | $R^3$ | n | $R^1$ | $R^2$ |
|---|---|---|---|---|
| 1 | 5-$NO_2$ | 1 | H | H |
| 2 | 5-$C_6H_5$C(=O)— | 1 | $CH_3$ | Cl |
| 3 | 5-$C_6H_5CH_2$ | 1 | H | $C_6H_5$ |
| 4 | 5,6-di-$CH_3$ | 2 | $C_6H_5$ | $C_6H_5CH_2$ |
| 5 | 5-$C_4H_9$—O— | 1 | $C_2H_5$ | $CH_2COOH$ |
| 6 | 5-N($CH_3$)$_2$ | 1 | H | $C_6H_5C_2H_4$— |
| 7 | 5-$NO_2$ | 1 | —$CH_2$—$COOCH_3$ | —$C_6H_4$—$OCH_3$ |
| 8 | H | — | H | $C_6H_{13}$ |
| 9 | 5-$C_2H_5O$ | 1 | —($CH_2$)$_2$$COOCH_3$ | $CH_3$ |
| 10 | 7-CN | 1 | —($CH_2$)$_3$$COOC_6H_5$ | F |
| 11 | 5-$CH_3O$ | 1 | H | Br |
| 12 | 5,6-di-Cl | 2 | —$COOC_2H_5$ | H |
| 13 | 5-F | 1 | H | CN |
| 14 | 5-$CF_3$—$C_6H_4$— | 1 | p-$CH_3C_6H_4$— | —$C_3H_6COOCH_3$ |
| 15 | $C_4H_9$ | 1 | H | —$CH_2COOCH_3$ |
| 16 | 6-$C_6H_5$ | 1 | —($CH_2$)$_3$—$COOCH_3$ | H |
| 17 | 5-$C_6H_5$C(=O) | 1 | H | —$CH_2$—$COOC_6H_5$ |
| 18 | 6-$C_6H_5$C(=O) | 1 | $C_4H_9$ | $C_6H_5$ |
| 19 | 6-$C_6H_5CH_2O$ | 1 | H | ($C_2H_5$)$_2$$NCH_2CH_2$— |

It will be apparent that compounds of the invention wherein $R^1$, $R^2$ or $R^3$ is carboxyl, amino or amido can be formed from coupounds of the invention (I) wherein $R^1$, $R^2$ or $R^3$ is nitrile or ester, nitro or amino, respectively, employing standard chemical procedures as will be apparent to one skilled in the art.

Examples of aliphatic haloalkylisothiocyanates which can be employed herein include the following:

$$SCN-CH_2CH_2Br$$
$$SCN-CH_2CH_2CH_2Cl$$

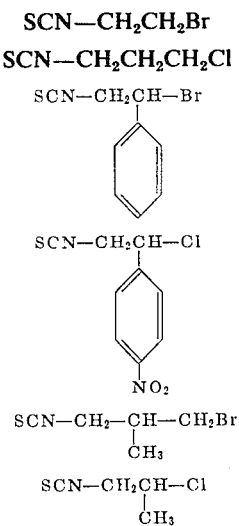

$$SCN-CH_2-CH-CH_2Br$$
$$\phantom{SCN-CH_2-}|\phantom{CH-CH_2Br}$$
$$CH_3$$

$$SCN-CH_2CH-Cl$$
$$\phantom{SCN-CH_2}|$$
$$CH_3$$

The compounds of Formula (I) form physiologically acceptable acid-addition salts with inorganic and organic acids. These acid-addition salts frequently provide useful means for isolating the products from reaction mixtures by forming the salt in a medium in which it is insoluble. The free base may then be obtained by neutralization, e.g., with a base such as sodium hydroxide. Then any other salt may again be formed from the free base and the appropriate inorganic acid. Illustrative are the hydrohalides, especially the hydrochloride and hydrobromide which are preferred, sulfate, nitrate, phosphate, oxalate, tartrate, maleate, fumerate, citrate, succinate, methanesulfonate, benzenesulfonate, toluenesulfonate, and the like.

The indole derivatives are useful as anti-inflammatory agents. They may be used to decrease joint swelling, tenderness, pain and stiffness in mammalian species, such as dogs and monkeys, e.g., in conditions such as rheumatoid arthritis. Compounds of Formula I may be compounded for such use according to accepted pharmaceutical practice in oral dosage forms such as tablets, capsules, elixirs or powders for administration of about 100 mg. to 2 gm. per day, preferably 100 mg. to 1 gm. per day in two to four divided doses.

The following Examples further illustrate and represent preferred embodiments of the invention.

EXAMPLE 1

1-(2-Thiazolin-2-yl)indole, hydrochloride

To a solution of 5.0 g of indole dissolved in about 125 ml of dry ethyl ether there is added 1.4 g of sodium hydride and the mixture is stirred at room temperature for 45 minutes. Then 5.0 g of 2-chloroethylisothiocyanate in about 5 ml of dry ethyl ether is added and the mixture is refluxed for 1 hour. The solvent is evaporated and the residue is preabsorbed on neutral alumina and chromatographed. The product is eluted as an oil with petroleum ether-ethyl ether (1:1). The oil is dissolved in ethyl ether, ethereal hydrochloric acid is added, and the resulting salt is crystallized from methanol-ethyl ether yielding 3.5 g of the hydrochloride, m.p. 195°–197°.

Calcd. for $C_{11}H_{10}N_2S \cdot HCl$: C,55.35; H,4.65; N,11.73.
Found: C,55.50; H,4.73; N,11.94.

EXAMPLE 2

1-(5,6-Dihydro-4H-1,3-thiazin-2-yl)indole, hydrochloride

To a solution of 5.0 g of indole in about 125 ml of dry ethyl ether there is added 1.4 g of sodium hydride and the mixture is stirred for 0.75 hour. Then 7.5 g of 3-bromopropylisothiocyanate in about 5 ml of ethyl ether is added and the reaction is refluxed for 1.5 hours; the solvent is removed and the residue is preabsorbed on neutral alumina and chromatographed. Elution with petroleum ether-ethyl ether (2:1) yields an oil which is dissolved in ethyl ether, ethereal hydrochloric acid is added and the resulting product is filtered and crystallized from methanol-ethyl ether to yield 3.0 g, m.p. 171°–173°.

Anal. Calcd. for $C_{12}H_{12}N_2S \cdot HCl$: C,57.02; H,5.18; N,11.08.
Found: C,56.94; H,5.33; N,11.08.

EXAMPLE 3

5-Methoxy-1-(2-thiazolin-2-yl)indole

To a solution of 4.4 g of 5-methoxyindole in 100 ml dry glyme there is added 0.9 g of NaH and the mixture is stirred for 1 hour at room temperature. To this mixture there is added a 3.6 g solution of 2-chloroethylisothiocyanate in 5 ml of dry glyme and the reaction is refluxed for 1.5 hours. The solvent is removed *in vacuo*, water is added and the resulting solid is filtered off and crystallized from ethyl ether-petroleum ether yielding 2.5 g, m.p. 86°–88°.

Anal. Calcd. for $C_{12}H_{12}N_2O$: C,62.05; H,5.20; N,12.05.
Found: C,61.83; H,5.01; N,11.86.

EXAMPLE 4

5-Nitro-1-(2-thiazolin-2-yl)indole

To a solution of 4.9 g (0.035 mole) of 5-nitroindole in about 125 ml of dry glyme there is added 1.0 g of NaH and the mixture is stirred at room temperature for 0.75 hour. Then 4.2 g of 2-chloroethylisothiocyanate is added and the mixture is refluxed for 5 hours. The solvent is removed *in vacuo* and water is added to the residue. The resulting solid is filtered off, dried, and crystallized from ethyl ether to yield 2.7 g, m.p. 154°–155°.

Anal. Calcd. for $C_{11}H_9N_2O\ S$: C,53.43; H,3.53; N,16.99.
Found: C,53.65; H,3.89; N,16.88.

EXAMPLE 5

1-(5,6-Dihydro-4H-1,3-thiazin-2-yl)-5-nitro-indole

To a solution of 4.8 g of 5-nitroindole in approximately 125 ml of dry glyme there is added 0.9 g of NaH. After stirring at room temperature for 0.5 hour there is added 5.2 g of 3-bromopropylisothiocyanate and the mixture is refluxed for 2 hours. The solvent is removed *in vacuo* and water is added to the residue. The resulting solid is filtered off, dried and crystallized from ethyl ether to yield 2.5 g, m.p. 124°–126°.

Anal. Calcd. for $C_{12}H_{11}N_3O_2S$: C,55.16; H,4.24; N,16.08.
Found: C,55.01; H,4.01; N,15.93.

EXAMPLES 6 TO 72

Following the procedure of Examples 1 to 5 but substituting the indole derivative shown in column 1 of Table I below and the aliphatic haloalkylisothiocyanate shown in column 2, the product shown in column 3 is obtained.

TABLE I

| | Column 1 | | | Column 2 | Column 3 | |
|---|---|---|---|---|---|---|
| Ex. No. | $R^3$ (position) | n | $R^2$ | $R^1$ | Haloalkylisothiocyanate | $(R^3)_n$(position) $R^2 R^1$ / $R^4$ |
| 6 | H | .... | $C_6H_5$ | H | $SCN-CH_2-CH_2-Br$ | ---- / [thiazoline, $R^4$ = H] |
| 7 | H | .... | 3-CH$_3$-C$_6$H$_4$ (H$_3$C-phenyl) | CH$_3$ | Same as above | As in Column 1 / Same as above |
| 8 | H | .... | 2-Cl-C$_6$H$_4$ | $C_6H_5$ | ....do.... | Do. |
| 9 | CH$_3$ (5) | 1 | 4-CH$_3$-C$_6$H$_4$ | H | ....do.... | Do. |
| 10 | NO$_2$ (5) | 1 | 2,4-Cl$_2$-C$_6$H$_3$ | $-CH_2COOCH_3$ | ....do.... | Do. |
| 11 | Cl (5, 6) | 2 | 2-naphthyl | H | ....do.... | Do. |
| 12 | H | .... | CN | $-CH_2COOC_2H_5$ | ....do.... | Do. |
| 13 | CH$_3$O (5) | 1 | $C_6H_5$ | H | ....do.... | Do. |
| 14 | CH$_3$C(O) (6) | 1 | 4-OCH$_3$-C$_6$H$_4$ | $C_2H_5$ | ....do.... | Do. |
| 15 | NO$_2$ (5) | 1 | NO$_2$ | H | ....do.... As in Column 1 | Do. |
| 16 | H | .... | COCH$_3$ | H | ....do.... | Do. |
| 17 | Cl (6) | 1 | CO$_2$C$_2$H$_5$ | H | ....do.... | Do. |
| 18 | CH$_3$C(O) (5) | 1 | H | $C_6H_5$ | ....do.... | Do. |
| 19 | C$_2$H$_5$O (5) | 1 | CO$_2$C$_2$H$_5$ | CH$_3$ | ....do.... | Do. |
| 20 | C$_6$H$_5$C(O) (5) | 1 | CH$_3$-C$_6$H$_4$ | H | $SCN-CH_2CH_2CH_2Cl$ | ---- / [6-membered thiazine, 2-methyl] |
| 21 | (CH$_3$)$_2$N— (5) | 1 | $C_6H_5$ | H | Same as above | Same as above. |
| 22 | C$_2$H$_5$C(O) (5) | 1 | $-CH_2C_6H_5$ | CH$_3$ | ....do.... | Do. |
| 23 | C$_3$H$_7$C(O) (5) | 1 | Cl | $C_6H_5$ | ....do.... | Do. |
| 24 | Cl (5, 7) | 2 | H | H | ....do.... | Do. |
| 25 | NO$_2$ (6) | 1 | $C_6H_5$ | H | $SCN-CH_2CH_2CH_2-Br$ | Do. |
| 26 | H | .... | $C_6H_5$ | $CO_2C_2H_5$ | Same as above | As in Column 1 / Do. |

TABLE I

| | Column 1 | | Column 2 | Column 3 | |
|---|---|---|---|---|---|
| | 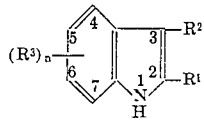 | | Haloalkylisothiocyanate | 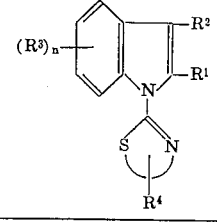 | |
| Ex. No. | $R^3$ (position) | n | $R^2$ | $R^1$ | | $(R^3)_n$(position) $R^2 R^1$ | $R^4$ |

| Ex. No. | $R^3$ (position) | n | $R^2$ | $R^1$ | | | |
|---|---|---|---|---|---|---|---|
| 27 | H | | $CO_2CH_3$ | $CO_2CH_3$ | ...do... | | Do. |
| 28 | $N(CH_3)_2$ (5) | 1 | $CH_2CO_2CH_3$ | H | ...do... | | Do. |
| 29 | $NO_2$ (5) | 1 |  | H | ...do... | | Do. |
| 30 | $C_2H_5(CH_3)N-$ | 1 | H | $CH_3$ | ...do... | | Do. |
| 31 | $-CN$ (6) | | H | H | ...do... | | Do. |
| 32 | H | 1 | $CH_2CH_2N(CH_3)_2$ | H | $SCN-CH_2CHCl$<br>        $C_6H_5$ | | 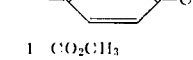 |
| 33 | H | | $-CH_2COOCH_3$ | $CH_3$ | $SCN-CH_2-CH_2Br$ | | |
| 34 | $CH_3$ (4) | 1 | $CH_2CH_2N(CH_3)_2$ | $C_2H_5$ | $SCN-CHCH_2Cl$<br>        $CH_3$ | | |
| 35 | Cl (5) | 1 | $CH_2CN$ | H | $SCN-CH_2CH_2Cl$ | | |
| 36 | H | | | $C_6H_5$ | $SCN-CH_2CH_2Br$ | As in Column 1 | Same as above. |
| 37 | $NO_2$ | 1 | $CO_2CH_3$ | H | $SCN-CH_2CH_2Cl$ | | Do. |
| 38 | H | | $C_4H_9$ | $COOC_2H_5$ | $SCN-CHCH_2-Br$<br>        $C_2H_5$ | | |
| 39 | Br (5) | 1 | Br | $-CH_2COOC_2H_5$ | $SCN-CH_2CH_2Cl$ | | |
| 40 | $C_4H_9\overset{O}{\underset{\|}{C}}$ (6) | 1 | H | $-(CH_2)_2COOCH_3$ | $SCNCH_2CH_2Cl$ | | Same as above. |
| 41 | H | | CN | H | $SCNCH_2CH_2CH_2Br$ | | |
| 42 | H | | Cl | H | $SCNCH_2CH_2CH_2Cl$ | | Same as above. |

TABLE I

| | Column 1 | | | Column 2 | Column 3 | |
|---|---|---|---|---|---|---|
| Ex. No. | R³ (position) | n | R² | R¹ | Haloalkylisothiocyanate | (R³)ₙ(position) R²R¹ | R⁴ |

| Ex. No. | R³ (position) | n | R² | R¹ | Haloalkylisothiocyanate | (R³)ₙ(position) R²R¹ | R⁴ |
|---|---|---|---|---|---|---|---|
| 43 | H | — | Br | H | SCNCH₂CH₂CHBr / C₆H₅ | | (thiazoline, CH₃) |
| | | | | | | | (thiazine, C₆H₅) |
| 44 | H | — | CH₂COOCH₂C₆H₅ | H | SCNCH₂CH₂CHCl / C₆H₅ | As in Column 1 | Same as above. |
| 45 | H | — | CN | H | SCNCH₂CH₂CH₂Br | | (pyrimidine, CH₃) |
| 46 | C₂H₅O (5) | 1 | CH₃ | H | SCNCH₂CH₂CH₂Cl | | Same as above. |
| 47 | C₆H₅CH₂— (6) | 1 | H | CH₃ | Same as above | | Do. |
| 48 | CH₃-C₆H₄- (5) | 1 | —CH₂COOCH₃ | C₃H₇ | ...do | | Do. |
| 49 | C₄H₉C(O)— (6) | 1 | —C₅H₁₁ | C₆H₅ | ...do | | Do. |
| 50 | C₆H₅C(O)— (5) | 1 | H | H | SCNCH₂CH₂CH₂Br | | Do. |
| 51 | C₄H₉ (6) | 1 | H | H | Same above | | Do. |
| 52 | C₃H₇O— (5) | 1 | (CH₃)₂NCH₂CH₂— | COOC₂H₅ | ...do | | Do. |
| 53 | C₆H₅O (5) | 1 | H | C₅H₁₁ | ...do | | Do. |
| 54 | CH₃C₆H₄O (5) | 1 | H | (CH₂)₃COOC₃H₇ | ...do | | Do. |
| 55 | CH₃ (5), CH₃ (6) | 2 | p-I-C₆H₄- | CH₂COOC₄H₉ | ...do | | Do. |
| 56 | —CH₃ | 1 | NO₂ | CH₂COOC₆H₅ | ...do | As in Column A | Do. |
| 57 | NO₂ (5) | 1 | p-C₂H₅-C₆H₄- | H | SCNCH₂CH₂CH₂Cl | | Do. |
| 58 | (CH₃)₂—N—(CH₂)₂— (6) | 1 | H | CH₃ | SCNCH₂CH₂Cl | | (thiazole, CH₃) |
| 59 | CH₃C(O) (5) | 1 | H | C₄H₉ | Same as above | | Same as above. |
| 60 | C₆H₅C(O) (6) | 1 | Cl | C₆H₅ | ...do | | Do. |
| 61 | —CN (5) | 1 | H | H | ...do | | Do. |
| 62 | CH₃ (5) | 1 | H | H | ...do | | Do. |
| 63 | NO₂ (6) | 1 | Br | (CH₂)₅COOC₄H₉ | SCNCH₂CH₂Br | | Do. |
| 64 | NO₂ (5) | 1 | CH₃ | H | Same as above | | Do. |
| 65 | CN (5) | 1 | C₆H₅ | CH₂COOC₃H₇ | ...do | | Do. |
| 66 | (CH₃)₂N(CH₂)— with CH₃ | 1 | C₂H₅ | COOC₂H₅ | SCNCH₂CH₂Br | As in Column 1 | Do. |
| 67 | C₆H₅—C(O)— (5) | 1 | CH₂Cl | COOC₅H₁₁ | SCNCH₂CHCl | | (¹) p-NO₂-C₆H₄- |

TABLE I

| Ex. No. | Column 1 | | | Column 2 | Column 3 | |
|---|---|---|---|---|---|---|
| | $R^3$ (position) | n | $R^2$ | $R^1$ | Haloalkylisothiocyanate | $(R^3)_n$(position) $R^2 R^1$ $R^4$ |
| 68 | $NO_2$ (5) | 1 | $CH_2COOC_2H_5$ | H | $SCNCH_2CH_2Br$ |  |
| 69 | $C_2H_5\overset{O}{\underset{\|}{C}}$ (6) | 1 | $C_4H_9$ | ---- | $SCNCH_2\underset{\underset{C_6H_5}{\|}}{C}HBr$ | $C_6H_5-$ thiazoline |
| 70 | $C_6H_5$ (5) | 1 | $CH_3$ | H | $SCNCH_2CH_2\underset{\underset{C_6H_5}{\|}}{C}HCl$ | $C_6H_5-$ thiazine |
| 71 | $CH_3\overset{O}{\underset{\|}{C}}$ (5) | 1 | CN | ---- | $SCNCH_2\underset{\underset{CH_3}{\|}}{C}HCH_2Br$ | $CH_3$ thiazine |
| 72 | H | ---- | H | $C_6H_5$ | $SCNCH_2CH_2\underset{\underset{C_6H_5}{\|}}{C}HBr$ | $C_6H_5-$ thiazine |

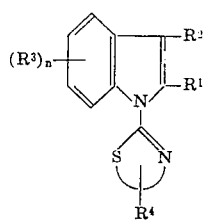

What is claimed is:

1. A compound of the structure

wherein $R_3$ is selected from the group consisting of hydrogen; lower alkyl; lower alkoxy; aryl; aryloxy;

$$R^\circ-\overset{O}{\underset{\|}{C}}-$$

wherein $R^\circ$ is selected from the group consisting of lower alkyl, lower alkenyl, monocyclic aryl, monocyclic aryl-lower alkyl, cycloalkyl, cycloalkenyl, cycloalkyl-lower alkyl and cycloalkyl-lower alkenyl; nitro; halogen; cyano; amino; mono- or di-lower alkyl, arylalkyl-, lower alkylaryl- or arylamino;

$$R^5\overset{O}{\underset{\|}{C}}NH-$$

wherein $R^5$ is selected from the group consisting of hydrogen, lower alkyl, and aryl; dialkylaminoalkyl; or carboxyl; $R^1$ is selected from the group consisting of hydrogen, lower alkyl, aryl or $-(CH_2)_1CO_2R^4$; $R^2$ is selected from the group consisting of hydrogen, lower alkyl, cycloalkyl, aryl $-(CH_2)_1CO_2R^4$, cyano, halogen, dialkylaminoalkyl and nitro; $R^4$ is selected from the group consisting of hydrogen, lower alkyl or aryl; and

represents a 5 or 6 membered ring; n is 1 or 2, $n^1$ is 0 to 5; aryl is a mono or bi-carbocyclic aromatic ring system; alkyl is alkyl of one to seven carbon atoms; and physiologically acceptable acid addition salts thereof.

2. A compound in accordance with claim 1 having the structure

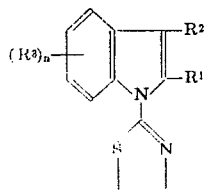

3. A compound in accordance with claim 1 having the structure

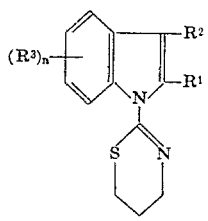

4. A compound in accordance with claim 1 having the structure

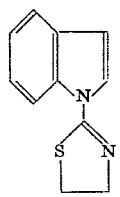

5. A compound in accordance with claim 1 having the structure

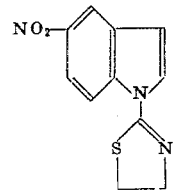

6. A compound in accordance with claim 1 having the structure

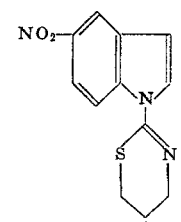

7. A compound in accordance with claim 1 having the structure

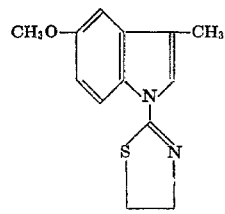

8. A compound in accordance with claim 1 having the name 1-(2-thiazolin-2-yl)indole, hydrochloride.

* * * * *

UNITED STATES PATENT OFFICE
CERTIFICATE OF CORRECTION

Patent No. 3,755,316          Dated August 28, 1973

Inventor(s) Venkatachala L. Narayanan and Rudiger D. Haugwitz

It is certified that error appears in the above-identified patent and that said Letters Patent are hereby corrected as shown below:

Column 1, lines 25 and 26, that portion reading:
"$-(CH_2)09_1CO_2R^4$" should be: -- $-(CH_2)_{n1}CO_2R^4$ --.

Column 1, line 27, after the word "cycloalkyl" insert a comma (,).

Column 1, line 27, that portion reading: "$-(CH_2)1CO_2R^4$"
should be: -- $-(CH_2)_{n1}CO_2R^4$ --.

Column 14, lines 59 and 61, that portion reading:
"$-(CH_2)1CO_2R^4$" should be: -- $-(CH_2)_{n1}CO_2R^4$ --.

Column 14, line 61, after the word "aryl" insert a comma (,).

Column 15, Claim 2, that portion of the structure reading:

"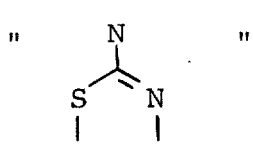"      should be: -- 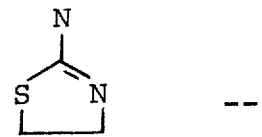 --

Signed and sealed this 16th day of April 1974.

(SEAL)
Attest:

EDWARD M. FLETCHER, JR.
Attesting Officer

C. MARSHALL DANN
Commissioner of Patents